United States Patent Office 3,494,644
Patented Feb. 10, 1970

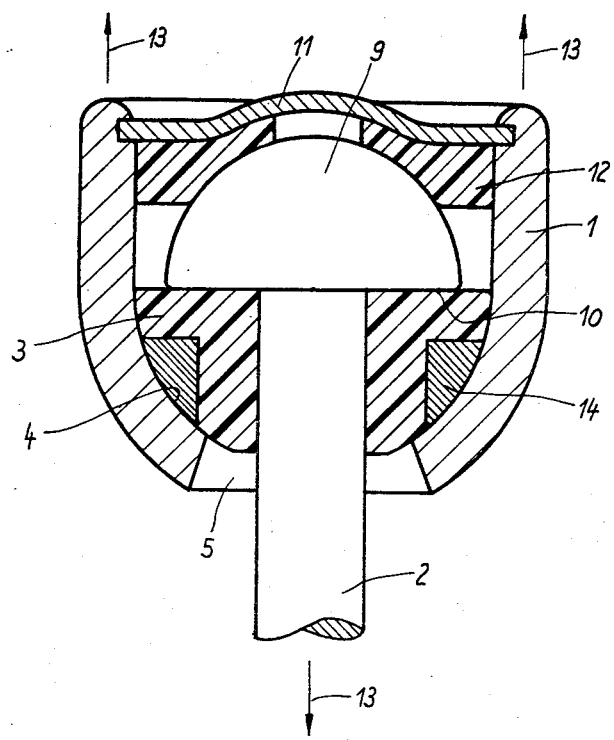

3,494,644
BALL JOINTS, ESPECIALLY FOR TENSILE LOADS
Rudolf Gottschald, Osterath, Germany, assignor to
Messrs. A. Ehrenreich & Cie, Dusseldorf-Oberkassel,
Germany
Filed Dec. 15, 1967, Ser. No. 690,825
Claims priority, application Germany, Dec. 22, 1966,
E 33,075
Int. Cl. F16c 11/06
U.S. Cl. 287—87  1 Claim

ABSTRACT OF THE DISCLOSURE

A ball and socket joint having flanged bushing of plastic material surrounding the ball pin and in contact with the ball head and the housing. A sintered metal arcuate, ring-shaped body inserted in a portion of said bushing and having a surface contiguous therewith, the entire device designed to receive heavy tensile loads while preserving the gliding characteristics of the ball body.

---

The present invention relates to a ball joint, especially for tensile loads and more particularly for guides, guide rods, wheel suspensions, and similar, preferably of motor vehicles, said joint comprising a joint case and a joint pin which is universally movable within a hollow ball surface of said joint case via a ball body consisting of another material its surface being made partially of a synthetic and partially of a metallic material, while the joint pin is able to rotate around its axis in said ball body supporting a collar of said joint pin.

Ball joints comprising a ball body passed by a rotating joint pin are already known in which the ball body is made from synthetic material resulting in improved gliding qualities of the ball body in the hollow ball surface of the joint case end in the ball body bore passed by the joint pin. Ball joints of this type are not particularly suited to receive major tensile loads because their gliding surfaces deteriorate in the presence of great loads.

Ball joints having a metal ball body to support the joint pin in the joint case are also suited to receive heavy tensil loads acting in the direction of the joint pin. The gliding qualities in the bearing surface of the joint case and in the bore passed by the joint pin are, however, less favorable.

Another ball joint which is also already known comprises a ball body passed by the joint pin which has been made from synthetic material, the surface facing the opening where the joint pin leaves the joint case being a sheet metal cap attached to the ball body. Said sheet metal cap is to prevent the ball body from wearing with respect to the inside rim of the passage opening for the joint pin and the synthetic material forming the ball body from swelling into the passage opening. The capability of the joint to receive tensile loads has not substantially been improved by this measure.

The principal object of the present invention is to provide a ball joint of the type mentioned above in which the ball body has the good gliding qualities of synthetic material and the loading capacity of metal.

According to the present invention this problem has been solved in that the ball body is a flange box of synthetic material the flange being located on the supporting side and comprising a cylindrical ring of sintered metal having a spherical exterior surface and being pushed onto the box, the spherical exterior surface aligning with the exterior ball surfaces of the flange box.

The result is a combination of the favorable bearing properties of sintered metal and of the favorable gliding qualities of synthetic material preferably being acetal resin. The rotary movements of the joint pin are effected on synthetic material surfaces only. The tensile loads of the joint are received by the sintered metal ring.

The ring consisting of sintered metal or sintered iron respectively forms the surface part of the ball body transferring the joint loads acting into the direction of the joint pin mainly to the joint case.

With the subject matter of the present invention sintered metal is especially favorable in that it is able to receive lubricating or gliding agents due to a certain porosity thus not leading to any undesirable decrease in the running qualities of the joint. Additionally, molding of sintered metal is very simple generally not requiring any finishing.

The drawing is an example of a construction according to the present invention showing a vertical section of a ball joint for tensile loads.

The joint case has been defined as 1, housing the joint pin 2 universally movable via a spherical segment 3. The spherical segment is movably supported in a hollow ball surface 4 of the joint case at the side of the passage opening 5 for the joint pin.

On the side facing the passage opening 5 of the joint pin from the joint case the spherical segment 3 preferably consisting of acetal resin has been provided with an angular recess. An annular body 14 of sintered iron has been inserted into said recess. The exterior spherical surface of said annular body aligns, after insertion, with the spherical surface of the spherical segment, that means, the ball body has the form of a flange box onto which an internally cylindrical ring with a spherical exterior surface has been pushed.

The joint pin 2 has been provided with a head 9 having a spherical exterior surface and movably passes the spherical segment 3. The shoulder surface 10 of the head or collar contacts the flat surface of the spherical segment and is able to glide on the same.

The joint case is closed by the rolled in cover 11. An elastic disc 12, for instance of caoutchouc elastic polyurethane with an interlaced structure, has been provided between the cover 11 and the joint pin head, said disc pressing the pin head against the spherical segment.

The tensile loads of the joint are indicated by the arrows 13.

What is claimed is:
1. A ball and socket joint comprising:
 (a) a housing having two ends,
 (b) a pin extending through a pin opening at one end of said housing,
 (c) a ball head in said housing attached to said pin,
 (d) means substantially closing the other end of said housing,
 (e) a substantially hemispherical ball body having surfaces contacting said ball head and pin and another surface contacting said housing, said ball body including:
   (1) a flanged bushing of plastic material having a cylindrical portion surrounding said pin in said housing and at one end a flat, flanged portion abutting said ball head and having a segmental spherical bearing surface in contact with said housing, said cylindrical portion also having at its other end an exposed segmental spherical bearing surface contacting said housing and intersecting said opening,

(2) an arcuate ring-shaped body of sintered metal surrounding said bushing and having inner surfaces conforming to and in contact with said cylindrical portion and said flanged portion and an outer segmental spherical portion in contact with said housing and contiguous with said segmental spherical bearing portions of said flanged bushing so as to receive heavy tensile loads acting in the direction of the joint pin while preserving the gliding characteristics of the ball body.

References Cited

UNITED STATES PATENTS

| | | | |
|---|---|---|---|
| 2,937,895 | 5/1960 | Langen et al. | 287—87 |
| 2,977,131 | 3/1961 | Moskovitz et al. | |
| 3,041,094 | 6/1962 | Herbenor | 287—87 |
| 3,208,779 | 9/1965 | Sullivan | 287—87 |

REINALDO P. MACHADO, Primary Examiner

A. V. KUNDRAT, Assistant Examiner